United States Patent
Hidaka et al.

(10) Patent No.: US 9,625,292 B2
(45) Date of Patent: Apr. 18, 2017

(54) FLOW RATE MEASUREMENT DEVICE

(71) Applicant: Mitsubishi Electric Corporation, Chiyoda-ku, Tokyo (JP)

(72) Inventors: Shinichiro Hidaka, Tokyo (JP); Yuji Ariyoshi, Tokyo (JP); Masahiro Kawai, Tokyo (JP); Kazuhiko Otsuka, Tokyo (JP); Naoyuki Kishikawa, Tokyo (JP); Naoki Morinaga, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 280 days.

(21) Appl. No.: 14/598,550

(22) Filed: Jan. 16, 2015

(65) Prior Publication Data

US 2016/0097661 A1    Apr. 7, 2016

(30) Foreign Application Priority Data

Oct. 3, 2014   (JP) ................... 2014-204535

(51) Int. Cl.
*G01F 1/34*       (2006.01)
*G01F 1/696*      (2006.01)
*F02M 35/10*      (2006.01)

(52) U.S. Cl.
CPC ......... *G01F 1/34* (2013.01); *F02M 35/10386* (2013.01); *G01F 1/696* (2013.01)

(58) Field of Classification Search
CPC . G01F 1/684; G01F 1/696; G01F 1/34; F02D 41/18; F02M 35/10386
See application file for complete search history.

(56) References Cited

U.S. PATENT DOCUMENTS

| | | | | |
|---|---|---|---|---|
| 7,712,361 B2* | 5/2010 | Uramachi | ............. | G01F 1/6842 73/204.22 |
| 8,347,707 B2* | 1/2013 | Uramachi | ............. | G01F 1/6842 73/204.22 |
| 8,511,158 B2* | 8/2013 | Kishikawa | ............. | G01F 1/6842 73/204.22 |
| 8,813,556 B2* | 8/2014 | Matsumoto | ........... | G01F 1/6842 73/204.11 |
| 8,899,103 B2* | 12/2014 | Ariyoshi | ................... | G01F 5/00 73/114.34 |
| 9,194,764 B2* | 11/2015 | Dann | ......................... | G01F 1/00 |
| 9,234,817 B2* | 1/2016 | Kishikawa | ................ | G01F 9/00 |

(Continued)

FOREIGN PATENT DOCUMENTS

JP    5178388 B2    4/2013
JP    5279667 B2    9/2013

*Primary Examiner* — Freddie Kirkland, III
(74) *Attorney, Agent, or Firm* — Sughrue Mion, PLLC; Richard C. Turner

(57) ABSTRACT

An environment sensor is mounted on a second surface of a circuit board that does not have a wire bonding pad, and is arranged in a measuring chamber that is disposed in a circuit board receiving portion. The measuring chamber has a communication port for communication with a main passage. According to this configuration, process addition attributable to integration between a flow rate measurement device and the environment sensor is not required. The environment sensor does not affect air flow in a bypass passage, and thus detection accuracy of a flow rate detection element that is arranged in the bypass passage does not decline.

8 Claims, 7 Drawing Sheets

(56) References Cited

U.S. PATENT DOCUMENTS

| | | |
|---|---|---|
| 9,328,686 B2 * | 5/2016 | Kawai .................. G01F 1/69 |
| 2010/0031737 A1 | 2/2010 | Saito et al. |
| 2012/0079879 A1 | 4/2012 | Saito et al. |
| 2013/0283895 A1 | 10/2013 | Etherington et al. |

* cited by examiner

FLOW RATE MEASUREMENT DEVICE

BACKGROUND OF THE INVENTION

Field of the Invention

The present invention relates to a flow rate measurement device that measures a fluid to be measured passing through piping, for example, the amount of intake air of an internal combustion engine, and, more particularly, to a flow rate measurement device that is integrated with an environment sensor.

Description of the Background Art

Environment sensors such as a temperature measurement device, a humidity measurement device, and a pressure measurement device and control equipment are arranged, along with a flow rate measurement device that measures the amount of intake air, in an engine room of a car that uses an electronically-controlled fuel injection system. In recent years, reduction of vehicle parts assembly man-hours and wire harness simplification through integration between these environment sensors and the flow rate measurement device have been proposed.

For example, in Patent Document 1, a circuit board of a flow rate measurement device and at least one of a separate humidity measurement device and a separate pressure measurement device are assembled in a housing of the flow rate measurement device for flow rate measurement device-environment sensor integration.

In Patent Document 2, a flow rate detection element is arranged in a first sub-flow path that takes a part of intake air from a main passage, and a humidity measurement device that is mounted on a circuit board of a flow rate measurement device is arranged in a second sub-flow path that is disposed in the first sub-flow path.

In Patent Document 3, an environment sensor element is arranged in a measuring chamber that is disposed in an end portion of a supporting substrate to which a flow rate detection element and a signal processing circuit are fixed. In this example, the measuring chamber is positioned on the side opposite to the signal processing circuit across a sub-flow path where the flow rate detection element is arranged, and has a communication hole for communication with the sub-flow path.

[Patent Document 1] US Patent Publication No. 2013/0283895 A1
[Patent Document 2] Japanese Patent No. 5178388
[Patent Document 3] Japanese Patent No. 5279667

However, in the structures that are described in Patent Documents 1 to 3, integration between the flow rate measurement device and the environment sensor poses the following problems. In Patent Document 1, an environment sensor that is separate from the flow rate measurement device is integrated with the flow rate measurement device, and thus environment sensor assembly man-hours increase compared to a case where the environment sensor is mounted on the circuit board of the flow rate measurement device.

In Patent Document 2, the humidity measurement device is mounted on the circuit board of the flow rate measurement device and the circuit board is electrically connected to a connector terminal through wire bonding. In a case where the humidity measurement device is soldered on the same surface as a wire bonding pad on the circuit board, a flux is attached to the pad and bonding strength between a wire and the pad declines.

The circuit board has to be cleaned with a chemical after the soldering of the humidity measurement device so as to remove the flux attached to the wire bonding pad. However, the environment sensor such as the humidity measurement device may malfunction for chemical attachment, and measures such as protection of an element portion with a mask are required. This causes an increase in the process steps.

As a method for avoiding a circuit board cleaning process for flux removal, the wire bonding pad is arranged at a sufficient distance from the electronic component such as the humidity measurement device. In this case, the circuit board has to be larger in size although flux scattering to the pad can be prevented.

In the structure that is described in Patent Document 2, the second sub-flow path may be infiltrated by fouling substances, water droplets, or the like and the environment sensor element may be stained, which may cause reduction in detection response and detection accuracy of the environment sensor element. In addition, air flow in the first sub-flow path may be disturbed since the second sub-flow path is disposed in the first sub-flow path where the flow rate detection element is arranged. This may affect detection accuracy of the flow rate detection element.

In the structure that is described in Patent Document 3, an end face of the supporting substrate where the environment sensor element is arranged is exposed in the measuring chamber, and durability and reliability are required for the supporting substrate. Accordingly, a ceramic substrate has to be used for the supporting substrate, and cost reduction is impeded. Although the environment sensor element, the flow rate detection element, and the signal processing circuit are arranged on the same surface of the supporting substrate, the environment sensor element, the flow rate detection element, and the signal processing circuit cannot be arranged in close proximity, and thus the supporting substrate has to have a large size.

SUMMARY OF THE INVENTION

The present invention has been made in order to address the above-described problems, and an objective thereof is to provide a flow rate measurement device, which is integrated with an environment sensor in the interest of reliability and productivity and is reduced in size, at a low cost.

According to an aspect of the present invention, there is provided a flow rate measurement device that is inserted into a through-hole which is disposed in piping, and measures a flow rate of a fluid to be measured that has a main passage in the piping, the flow rate measurement device including a connector that includes a connector terminal which transmits and receives a signal to and from an external device, a flow rate detection element that is arranged in a bypass passage in which a part of the fluid to be measured passing through the main passage is taken, a circuit board that has a wire bonding pad arranged on one surface and is electrically connected to the connector terminal and the flow rate detection element through wire bonding, a circuit board receiving portion that supports and receives the circuit board, an environment sensor that is mounted on the other surface of the circuit board and measures at least one of temperature, humidity, and pressure of the fluid to be measured, and a measuring chamber that is disposed in the circuit board receiving portion, the environment sensor being arranged in the measuring chamber, in which the measuring chamber has a communication port for communication with the main passage.

According to the present invention, the environment sensor is mounted on the circuit board, and thus an increase in the number of processes attributable to environment sensor integration does not occur and productivity is not impaired. Since the environment sensor is mounted on the surface on the side opposite to the wire bonding pad, the circuit board can be reduced in size. Since the environment sensor is arranged in the measuring chamber that is disposed in the circuit board receiving portion, the environment sensor is not directly exposed to the fluid to be measured, and high detection response and detection accuracy can be achieved. In addition, airflow in the bypass passage where the flow rate detection element is arranged is not affected, and thus the flow rate measurement device can be obtained with high reliability without any decline in detection accuracy of the flow rate detection element.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
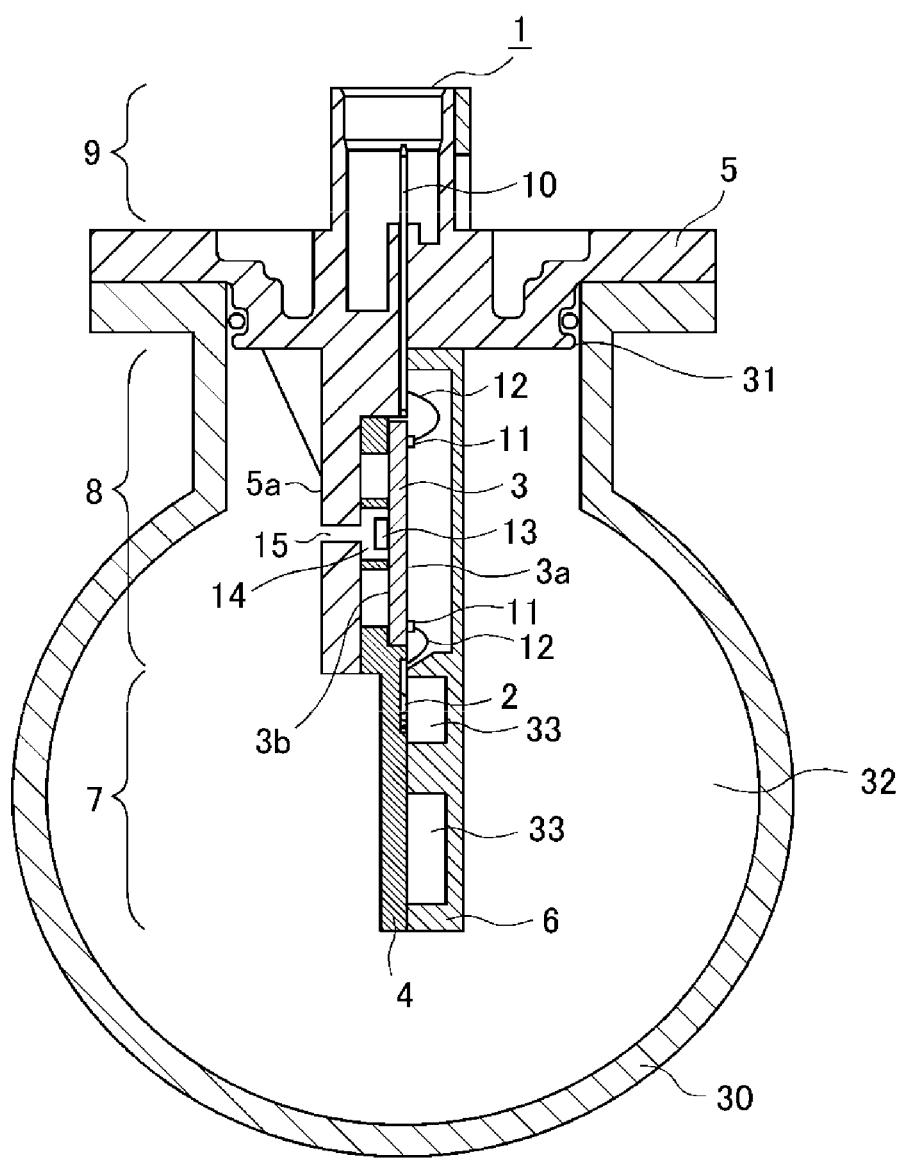
FIG. 1 is a cross-sectional view illustrating a flow rate measurement device according to a first embodiment of the present invention.
Figure 2:
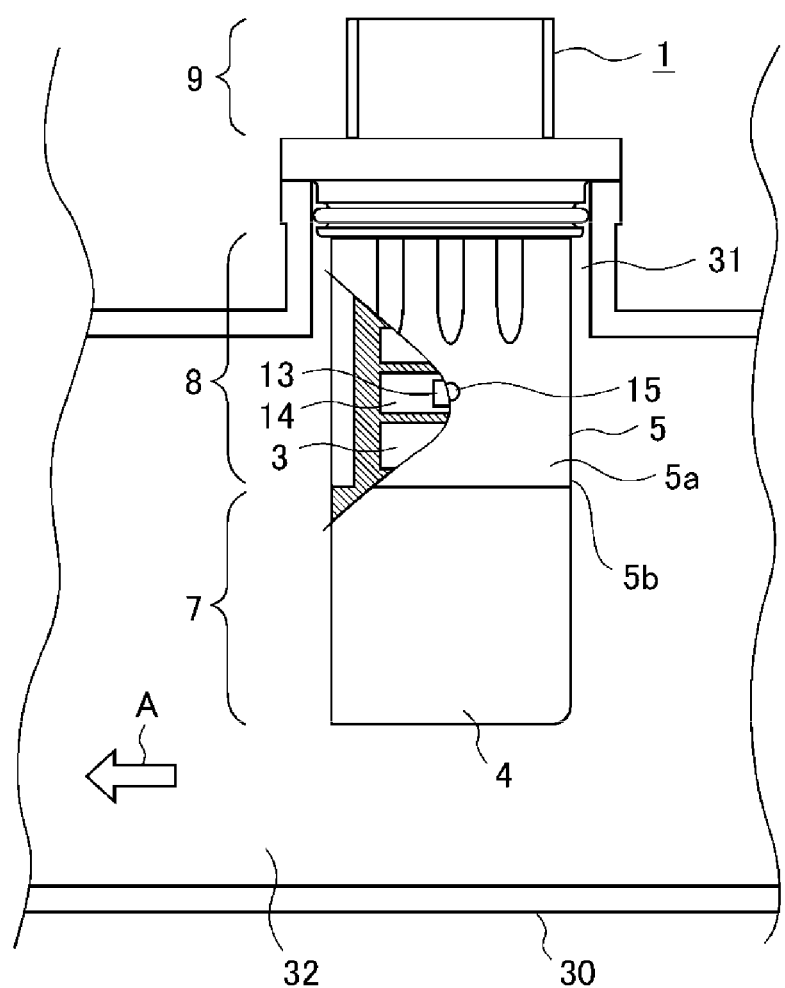
FIG. 2 is a side view in which a part of the flow rate measurement device according to the first embodiment of the present invention is cut.
Figure 3:
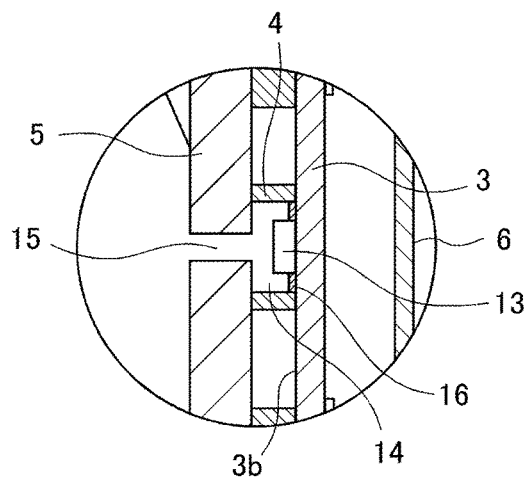
FIG. 3 is a cross-sectional view illustrating a measuring chamber of the flow rate measurement device according to the first embodiment of the present invention.

Hereinafter, a flow rate measurement device according to a first embodiment of the present invention will be described with reference to accompanying drawings. FIG. 1 is a cross-sectional view illustrating the flow rate measurement device according to the first embodiment. FIG. 2 is a side view in which a part of the flow rate measurement device according to the first embodiment is cut. FIG. 3 is a cross-sectional view illustrating a measuring chamber of the flow rate measurement device according to the first embodiment. The same reference numerals are attached to the same and corresponding parts in the drawings.

A flow rate measurement device 1 is inserted into a through-hole that is disposed in piping, and measures a flow rate of a fluid to be measured that has a main passage in the piping. In the first embodiment, the flow rate measurement device 1 is inserted into an insertion opening 31 that is formed in intake piping 30 of an internal combustion engine as illustrated in FIG. 1, and measures a flow rate of intake air that has a main passage 32 in the intake piping 30. An arrow A in FIG. 2 illustrates a direction in which the intake air flows through the main passage 32.

The flow rate measurement device 1 has a flow rate detection unit 7, a circuit board receiving portion 8, and a connector 9 in order from an insertion-direction tip portion. In the flow rate detection unit 7, a flow rate detection element 2 is supported by a plate 4, and the plate 4 is supported by a base 5. A cover 6 is arranged to be superimposed on the base 5 and the plate 4 and is bonded to the base 5 and the plate 4. The plate 4 and the cover 6 form a bypass passage 33 in which a part of the intake air passing through the main passage 32 is taken. The flow rate detection element 2 is arranged in the bypass passage 33.

The plate 4, the base 5, and the cover 6 constitute circuit board receiving portion 8. In the circuit board receiving portion 8, a circuit board 3 is supported by the plate 4 with one surface (first surface 3a) of the circuit board 3 covered by the cover 6 and the other surface (second surface 3b) of the circuit board 3 covered by the base 5.

The connector 9 that has a connector terminal 10 which transmits and receives a signal to and from an external device (not illustrated) is formed by a part of the base 5. The connector terminal 10 is molded integrally with the base 5. The flow rate measurement device 1 is installed in the intake piping 30 when a part of the base 5 is mounted on the intake piping 30 by using a screw (not illustrated) or the like out of the intake piping 30.

A wire bonding pad 11 (hereinafter, simply referred to as the pad 11) is arranged on the first surface 3a of the circuit board 3. The circuit board 3 is electrically connected to the connector terminal 10 and the flow rate detection element 2 through wire bonding in which a wire 12 is used as a bonding member.

An environment sensor 13 that measures at least one of temperature, humidity, and pressure of the fluid to be measured is mounted on the second surface 3b of the circuit board 3 by soldering. In other words, the environment sensor 13 includes at least one of a temperature measurement device that is provided with a temperature sensor, a humidity measurement device that is provided with a humidity sensor, and a pressure measurement device that is provided with a pressure sensor. The environment sensor 13 may include a measurement device other than those described above.

In addition, a plurality of electronic components (not illustrated) other than the environment sensor 13 are mounted on the first surface 3a and the second surface 3b of the circuit board 3 by soldering. All of the plurality of electronic components other than the environment sensor 13 may be mounted only on the second surface 3b or may be mounted only on the first surface 3a. In any case, the circuit board receiving portion 8 receives the circuit board 3 for the electronic components other than the environment sensor 13 not to be exposed to the fluid to be measured.

The environment sensor 13 is arranged in a measuring chamber 14 that is disposed at a part of the circuit board receiving portion 8. Only the environment sensor 13 is the electronic component that is arranged in the measuring chamber 14. In the first embodiment, the circuit board 3, the base 5, and the plate 4 constitute the measuring chamber 14. However, the measuring chamber 14 is not limited thereto. A joint between the environment sensor 13 and the circuit board 3 that is exposed in the measuring chamber 14 is coated with a coating agent 16.

The measuring chamber 14 has a communication port 15 for communication with the main passage 32 on a surface (side surface 5a of the base 5 illustrated in FIG. 2) that is parallel to a flow direction A of the intake air passing through the main passage 32. Accordingly, the environment sensor 13 that is arranged in the measuring chamber 14 can measure the temperature, the humidity, and the pressure of the intake air passing through the main passage 32.

A reason why the communication port 15 of the measuring chamber 14 is disposed in the side surface 5a of the base 5 that is parallel to the flow direction A of the intake air will be described with reference to FIG. 2. Upon reaching the flow rate measurement device 1, a part of the intake air passing through the main passage 32 collides with a front surface 5b of the base 5 and is separated from the flow rate measurement device 1. Accordingly, fouling substances, water droplets, and the like contained in the intake air are unlikely to reach the communication port 15 that is disposed in the side surface 5a which is orthogonal to the front surface 5b of the base 5. For this reason, it is preferable that the communication port 15 be disposed in the side surface 5a of the base 5.

Next, a mounting process that is used in a case where the electronic component other than the environment sensor 13 is mounted on the first surface 3a of the circuit board 3 and only the environment sensor 13 is mounted on the second surface 3b will be described as a method for manufacturing the flow rate measurement device 1.

The electronic component other than the environment sensor 13 is mounted, by soldering, on the first surface 3a that has the pad 11. Then, the circuit board 3 is cleaned with a chemical or the like so as to remove flux that is attached to the pad 11 through the soldering process. Then, the environment sensor 13 is mounted on the second surface 3b of the circuit board 3 by soldering.

In the mounting process, the electronic component other than the environment sensor 13 may be mounted on both the first surface 3a and the second surface 3b. Also, all of the electronic components including the environment sensor 13 may be mounted on the second surface 3b. In the latter case, flux attachment to the pad 11 does not occur, and thus the circuit board 3 does not have to be cleaned.

As described above, the environment sensor 13 is mounted on the circuit board 3, as is the case with the other electronic component, according to the first embodiment. Accordingly, process addition attributable to integration between the flow rate measurement device 1 and the environment sensor 13 is not required. The environment sensor 13 is mounted on the second surface 3b that does not have the pad 11, and thus no flux is attached to the pad 11 during the soldering of the environment sensor 13. Accordingly, a cleaning process for the circuit board 3 after the mounting of the environment sensor 13 can be avoided.

In a case where the electronic component other than the environment sensor 13 is soldered on the first surface 3a that has the pad 11, the flux attached to the pad 11 can be removed by cleaning the circuit board 3 before the mounting of the environment sensor 13. Accordingly, the pad 11 does not have to be arranged away from the electronic component and the circuit board 3 can be reduced in size.

Since the communication port 15 of the measuring chamber 14 where the environment sensor 13 is installed is disposed in the side surface 5a of the base 5 that is parallel to the flow direction A of the intake air passing through the main passage 32, the measuring chamber 14 is unlikely to be infiltrated by the fouling substances, the water droplets, and the like contained in the intake air. Accordingly, high detection response and detection accuracy can be achieved for the environment sensor 13.

Since the measuring chamber 14 is disposed in the circuit board receiving portion 8 that is isolated from the flow rate detection unit 7, the environment sensor 13 does not affect air flow in the bypass passage 33. Accordingly, decline in detection accuracy of the flow rate detection element 2 that is arranged in the bypass passage 33 is prevented by integration with the environment sensor 13.

In addition, an end face of the circuit board 3 is not exposed in the measuring chamber 14, and thus no ceramic substrate has to be used for the circuit board 3 and an inexpensive material such as a glass epoxy substrate can be selected for the circuit board 3. As described above, the flow rate measurement device 1 that is reduced in size can be obtained at a low cost according to the first embodiment with the flow rate measurement device 1 integrated with the environment sensor 13 in the interest of reliability and productivity.

Second Embodiment

Figure 4:
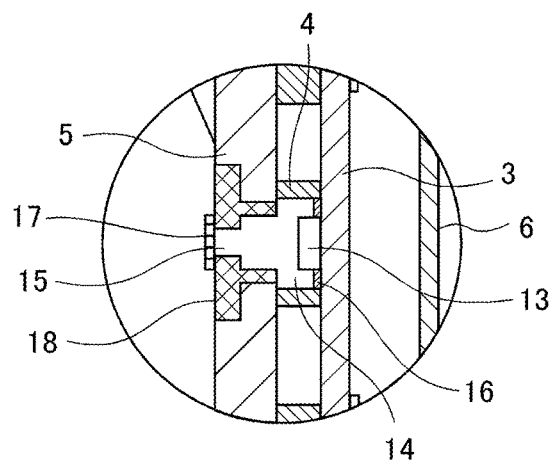
FIG. 4 is a cross-sectional view illustrating a measuring chamber of a flow rate measurement device according to a second embodiment of the present invention.
Figure 5:
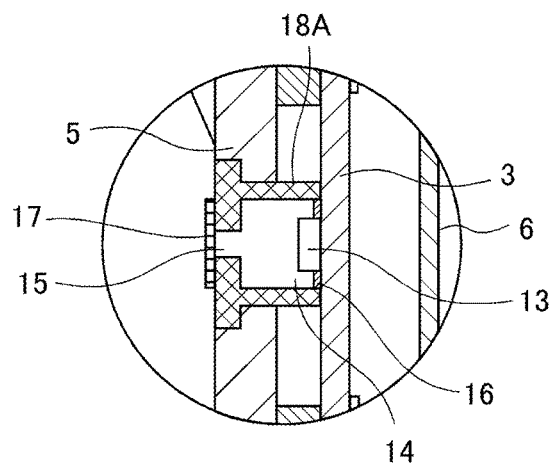
FIG. 5 is a cross-sectional view illustrating the measuring chamber of the flow rate measurement device according to the second embodiment of the present invention.

FIGS. 4 and 5 are cross-sectional views illustrating a measuring chamber of a flow rate measurement device according to a second embodiment of the present invention. The flow rate measurement device according to the second embodiment is similar in overall configuration to the flow rate measurement device according to the first embodiment, and thus FIG. 1 will be used not to repeat detailed description of each portion.

In the flow rate measurement device according to the second embodiment, a waterproof and moisture-permeable filter 17 is disposed at the communication port 15 of the measuring chamber 14 and is fixed with a cap 18. The filter 17 is fixed to a main passage 32 side surface of the cap 18 by bonding, welding, or the like. The cap 18 is bonded to the base 5 around the communication port 15.

In the example illustrated in FIG. 4, the circuit board 3, the plate 4, the filter 17, and the cap 18 constitute the measuring chamber 14. However, the configuration of the measuring chamber 14 is not limited thereto. For example, the circuit board 3, the filter 17, and a cap 18A may constitute the measuring chamber 14 as illustrated in FIG. 5. The cap 18A that is illustrated in FIG. 5 also has the function of the plate 4 in FIG. 4 and is bonded to the circuit board 3.

The filter 17 is disposed at the communication port 15 so that the measuring chamber 14 is not infiltrated by the fouling substances and the water droplets contained in the intake air. However, since the filter 17 is moisture-permeable, humidity measurement can be performed normally even in a case where the environment sensor 13 that is arranged in the measuring chamber 14 is the humidity measurement device. Accordingly, the filter 17 does not affect humidity detection response and humidity detection accuracy.

According to the second embodiment, effects similar to effects of the first embodiment can be achieved. In addition, according to the second embodiment, infiltration of the fouling substances, the water droplets, and the like from the main passage 32 into the measuring chamber 14 can be prevented more reliably than in the first embodiment.

Third Embodiment

Figure 6:
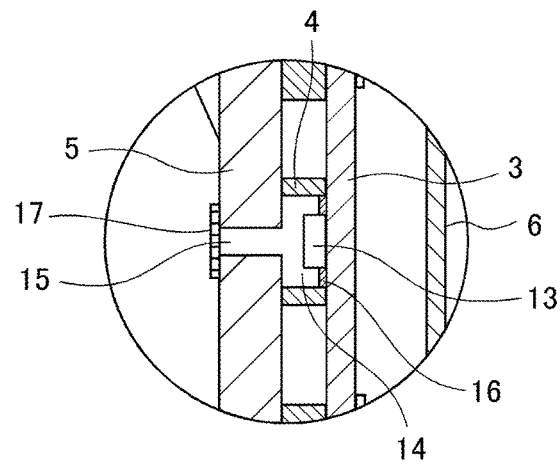
FIG. 6 is a cross-sectional view illustrating a measuring chamber of a flow rate measurement device according to a third embodiment of the present invention.
Figure 7:
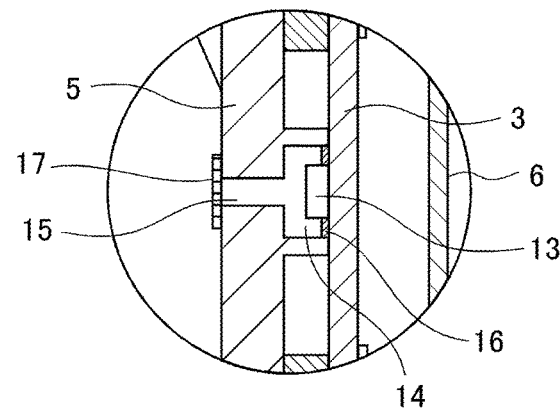
FIG. 7 is a cross-sectional view illustrating the measuring chamber of the flow rate measurement device according to the third embodiment of the present invention.

FIGS. 6 and 7 are cross-sectional views illustrating a measuring chamber of a flow rate measurement device according to a third embodiment of the present invention. The flow rate measurement device according to the third embodiment is similar in overall configuration to the flow rate measurement device according to the first embodiment, and thus FIG. 1 will be used not to repeat detailed description of each portion.

In the second embodiment, the waterproof and moisture-permeable filter 17 is fixed, with the cap 18, to the communication port 15 of the measuring chamber 14. However, in the third embodiment, the filter 17 is directly fixed, without using the cap 18, to the communication port 15 from the main passage 32 side of the base 5 that constitutes the measuring chamber 14.

In the example that is illustrated in FIG. 6, the circuit board 3, the base 5, the plate 4, and the filter 17 constitute the measuring chamber 14. However, the configuration of the measuring chamber 14 is not limited thereto. For example, the circuit board 3, the base 5, and the filter 17 may constitute the measuring chamber 14 as illustrated in FIG. 7.

According to the third embodiment, effects similar to the effects of the second embodiment can be achieved. In addition, according to the third embodiment, the cap 18 is not required since the filter 17 is directly fixed to the base 5, and thus the number of components can be reduced and a process for bonding the cap 18 to the base 5 is not required.

Fourth Embodiment

Figure 8:
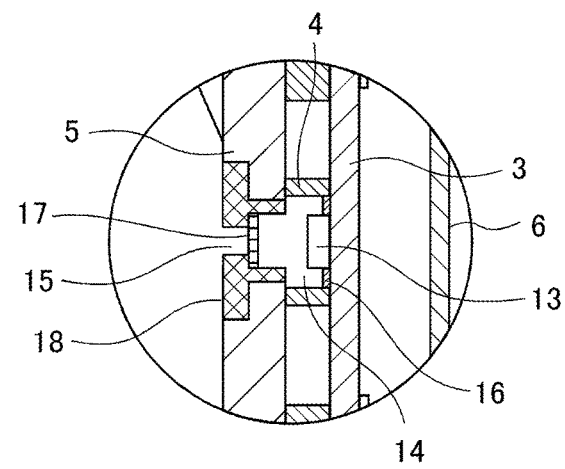
FIG. 8 is a cross-sectional view illustrating a measuring chamber of a flow rate measurement device according to a fourth embodiment of the present invention.
Figure 9:
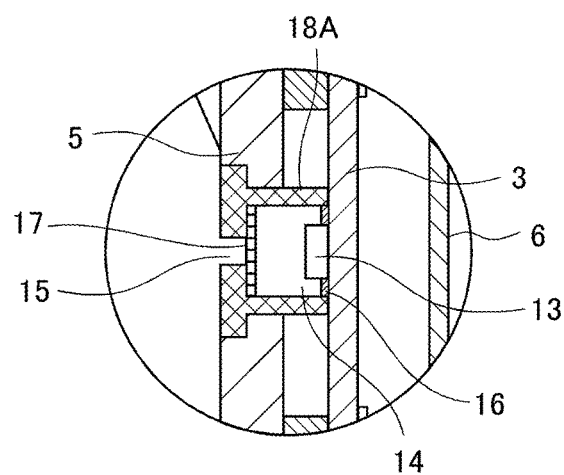
FIG. 9 is a cross-sectional view illustrating the measuring chamber of the flow rate measurement device according to the fourth embodiment of the present invention.

FIGS. 8 and 9 are cross-sectional views illustrating a measuring chamber of a flow rate measurement device according to a fourth embodiment of the present invention. The flow rate measurement device according to the fourth embodiment is similar in overall configuration to the flow rate measurement device according to the first embodiment, and thus FIG. 1 will be used not to repeat detailed description of each portion.

In the flow rate measurement device according to the fourth embodiment, the waterproof and moisture-permeable filter 17 is disposed at the communication port 15 of the measuring chamber 14 and is fixed with the cap 18. The filter 17 is fixed to a measuring chamber 14 side surface of the cap 18 by bonding, welding, or the like. The cap 18 is bonded to the base 5 around the communication port 15. Because of the fixing method described above, the filter 17 is unlikely to be in contact with a finger or the like during handling of the flow rate measurement device 1 and peeling of the filter 17 can be prevented.

In the example that is illustrated in FIG. 8, the circuit board 3, the plate 4, the filter 17, and the cap 18 constitute the measuring chamber 14. However, the configuration of the measuring chamber 14 is not limited thereto. For example, the circuit board 3, the filter 17, and the cap 18A may constitute the measuring chamber 14 as illustrated in FIG. 9. The cap 18A that is illustrated in FIG. 9 has the function of the plate 4 in FIG. 8 and is bonded to the circuit board 3.

The filter 17 is disposed at the communication port 15 so that the measuring chamber 14 is not infiltrated by the fouling substances and the water droplets contained in the intake air. Since the filter 17 is moisture-permeable, humidity measurement can be performed normally even in a case where the environment sensor 13 that is arranged in the measuring chamber 14 is the humidity measurement device. Accordingly, the filter 17 does not affect humidity detection response and humidity detection accuracy.

According to the fourth embodiment, effects similar to the effects of the first embodiment can be achieved. In addition, according to the fourth embodiment, infiltration of the fouling substances, the water droplets, and the like from the main passage 32 into the measuring chamber 14 can be prevented more reliably than in the first embodiment.

Fifth Embodiment

Figure 10:
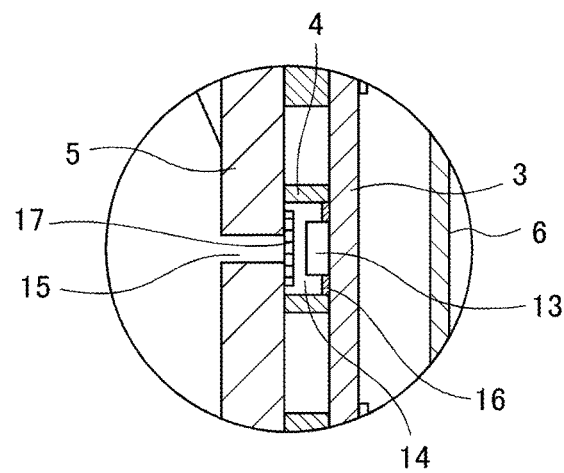
FIG. 10 is a cross-sectional view illustrating a measuring chamber of a flow rate measurement device according to a fifth embodiment of the present invention.
Figure 11:
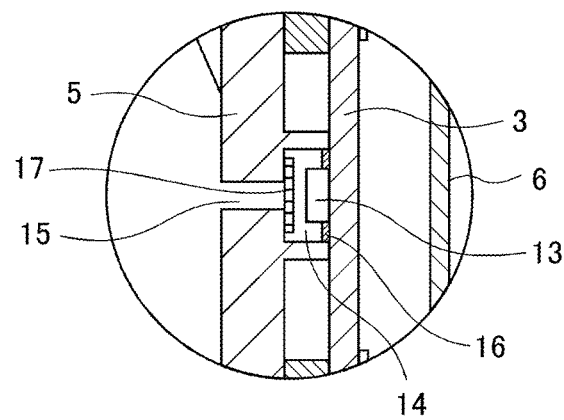
FIG. 11 is a cross-sectional view illustrating the measuring chamber of the flow rate measurement device according to the fifth embodiment of the present invention.

FIGS. 10 and 11 are cross-sectional views illustrating a measuring chamber of a flow rate measurement device according to a fifth embodiment of the present invention. The flow rate measurement device according to the fifth embodiment is similar in overall configuration to the flow rate measurement device according to the first embodiment, and thus FIG. 1 will be used not to repeat detailed description of each portion.

In the fourth embodiment, the waterproof and moisture-permeable filter 17 is fixed, with the cap 18, to the communication port 15 of the measuring chamber 14. However, in the fifth embodiment, the filter 17 is directly fixed, without using the cap 18, to the communication port 15 from an inner side of the base 5 that constitutes the measuring chamber 14. Because of the fixing method described above, the filter 17 is unlikely to be in contact with a finger or the like during the handling of the flow rate measurement device 1 and peeling of the filter 17 can be prevented.

In the example that is illustrated in FIG. 10, the circuit board 3, the base 5, the plate 4, and the filter 17 constitute the measuring chamber 14. However, the configuration of the measuring chamber 14 is not limited thereto. For example, the circuit board 3, the base 5, and the filter 17 may constitute the measuring chamber 14 as illustrated in FIG. 11.

According to the fifth embodiment, effects similar to the effects of the fourth embodiment can be achieved. In addition, according to the fifth embodiment, the cap 18 is not required since the filter 17 is directly fixed to the base 5, and thus the number of components can be reduced and a process for bonding the cap 18 to the base 5 is not required.

Sixth Embodiment

Figure 12:
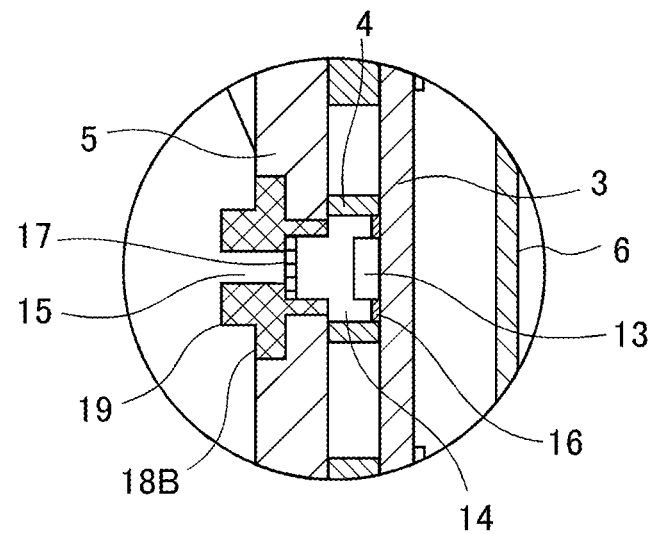
FIG. 12 is a cross-sectional view illustrating a measuring chamber of a flow rate measurement device according to a sixth embodiment of the present invention.
Figure 13:
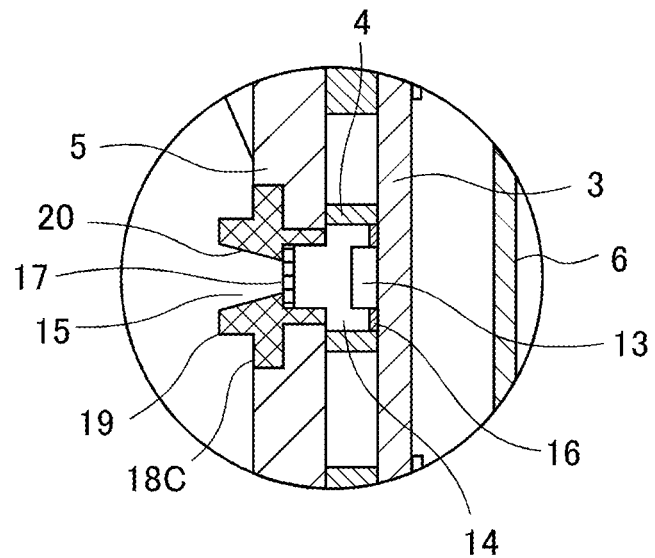
FIG. 13 is a cross-sectional view illustrating the measuring chamber of the flow rate measurement device according to the sixth embodiment of the present invention.

FIGS. 12 and 13 are cross-sectional views illustrating a measuring chamber of a flow rate measurement device according to a sixth embodiment of the present invention. The flow rate measurement device according to the sixth embodiment is similar in overall configuration to the flow rate measurement device according to the first embodiment, and thus FIG. 1 will be used not to repeat detailed description of each portion.

In a case where the communication port 15 is sealed by the water droplets and the like contained in the intake air and the measuring chamber 14 isolated from the main passage 32, the environment sensor 13 cannot accurately measure an environment parameter of the intake air passing through the main passage 32. In the sixth embodiment, a protruding portion 19 that surrounds the communication port 15 is disposed on the main passage 32 side of the side surface 5a of the base 5 that has the communication port 15 so that the water droplets and the like from the side surface 5a of the base 5 do not reach the communication port 15.

In the example that is illustrated in FIG. 12, the protruding portion 19 is molded integrally with a cap 18B that fixes the filter 17. In the example that is illustrated in FIG. 13, the protruding portion 19 has a tapered portion 20 for an opening portion to be widened toward the main passage 32 side and is molded integrally with a cap 18C. Since the tapered portion 20 is disposed in the protruding portion 19, the water droplets that are attached to the communication port 15 is likely to be discharged from the communication port 15 along the tapered portion 20.

In the sixth embodiment, the protruding portion 19 is molded integrally with the cap 18B and the cap 18C. However, the protruding portion 19 is not limited thereto. In a case where the filter 17 is directly fixed to the base 5 as in the fifth embodiment (refer to FIGS. 10 and 11), the protruding portion can be molded integrally with the base 5.

According to the sixth embodiment, the protruding portion 19 that surrounds the communication port 15 is disposed, and thus sealing of the communication port 15 by the water droplets and the like moving along the side surface 5a of the base 5 can be prevented. Accordingly, environment parameter measurement by the environment sensor 13 is performed with stability, and reliability is further improved.

Seventh Embodiment

Figure 14:
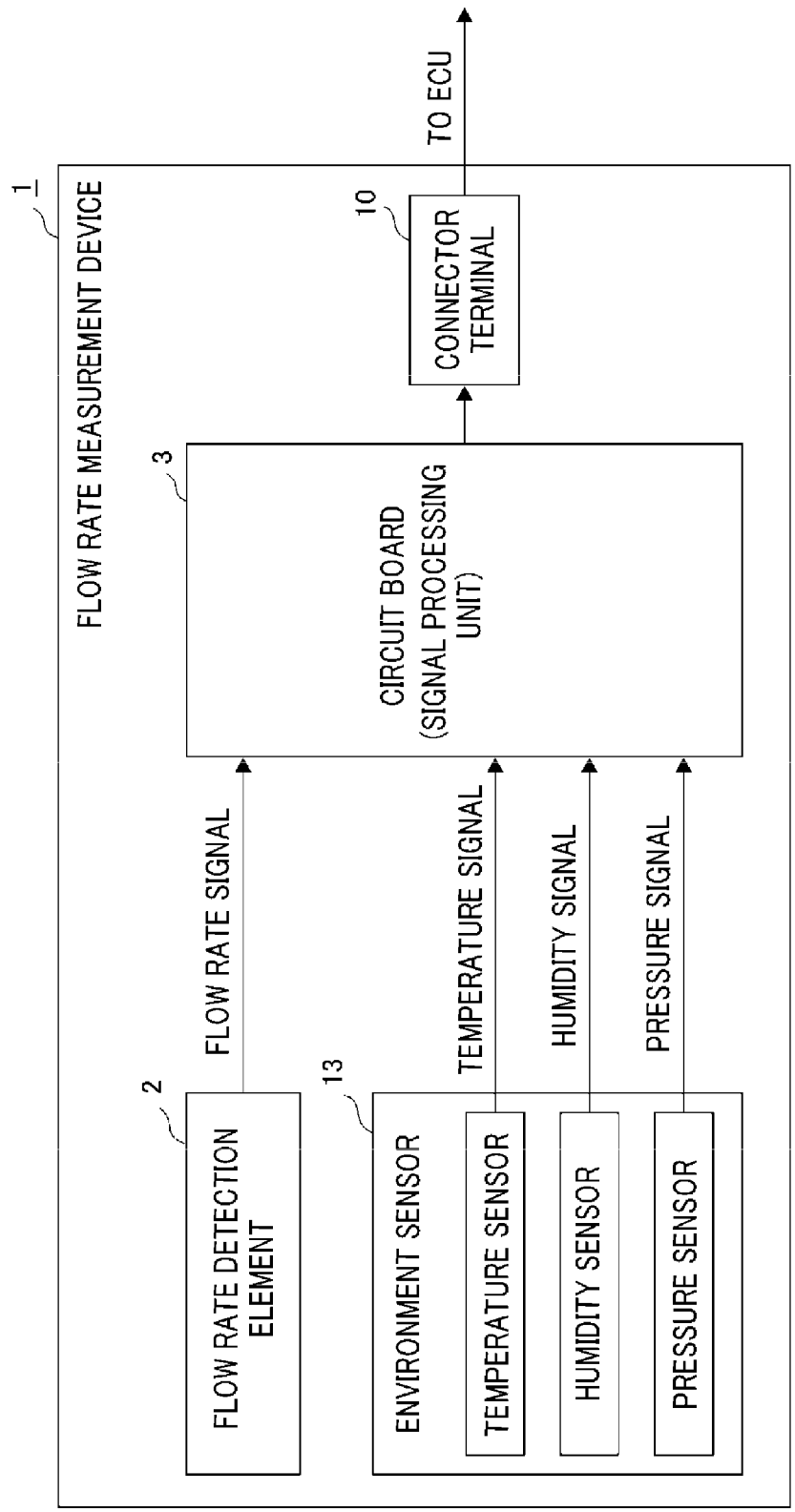
FIG. 14 is a diagram illustrating a sensor signal processing method for a flow rate measurement device according to a seventh embodiment of the present invention.

FIG. 14 is a diagram illustrating sensor signal processing for a flow rate measurement device according to a seventh embodiment of the present invention. In the seventh embodiment, an output of the environment sensor 13 is superimposed on an output of the flow rate measurement device 1, and the connector terminal 10 is not increased in number through integration with the environment sensor 13. The flow rate measurement device according to the seventh embodiment is similar in overall configuration to the flow rate measurement device according to the first embodiment, and thus FIG. 1 will be used not to repeat detailed description of each portion.

As illustrated in FIG. 14, the flow rate measurement device 1 outputs a flow rate signal. In a case where the environment sensor 13 includes the temperature sensor, the humidity sensor, and the pressure sensor, the flow rate measurement device 1 outputs a temperature signal, a humidity signal, and a pressure signal. Each of the sensor signals that are output from the environment sensor 13 is superimposed on the flow rate signal in a signal processing unit of the circuit board 3, and is transmitted to an engine control unit (ECU) via the connector terminal 10.

Any communication method that is in general use as an in-vehicle LAN communication method is used for communication between the flow rate measurement device 1 and the ECU. Examples thereof include single edge nibble transmission (SENT), local interconnect network (LIN), inter-integrated circuit (I2C), controller area network (CAN), and peripheral sensor interface 5 (PSI5).

According to the seventh embodiment, the flow rate measurement device 1 and the environment sensor 13 share the connector terminal 10, and thus the connector terminal 10 is not increased in number through integration between the environment sensor 13 and the flow rate measurement device 1. The embodiments of the present invention can be combined with each other or one another in the scope of the present invention and each of the embodiments can be appropriately modified or omitted.

Various modifications and alterations of this invention will be apparent to those skilled in the art without departing from the scope and spirit of this invention, and it should be understood that this is not limited to the illustrative embodiments set forth herein.

What is claimed is:

1. A flow rate measurement device that is inserted into a through-hole which is disposed in piping, and measures a flow rate of a fluid to be measured that has a main passage in the piping, the flow rate measurement device comprising:
    a connector that includes a connector terminal which transmits and receives a signal to and from an external device;
    a flow rate detection element that is arranged in a bypass passage in which a part of the fluid to be measured passing through the main passage is taken;
    a circuit board that has a wire bonding pad arranged on one surface and is electrically connected to the connector terminal and the flow rate detection element through wire bonding;
    a circuit board receiving portion that supports and receives the circuit board;
    an environment sensor that is mounted on the other surface of the circuit board and measures at least one of temperature, humidity, and pressure of the fluid to be measured; and
    a measuring chamber that is disposed in the circuit board receiving portion, the environment sensor being arranged in the measuring chamber,
    wherein the measuring chamber has a communication port for communication with the main passage.

2. The flow rate measurement device according to claim 1,
    wherein the measuring chamber has the communication port on a surface that is parallel to a flow direction of the fluid to be measured which passes through the main passage.

3. The flow rate measurement device according to claim 1,
    wherein an electronic component other than the environment sensor is mounted on one or both of the surface and the other surface of the circuit board, and the circuit board receiving portion receives the circuit board for the electronic component other than the environment sensor not to be exposed to the fluid to be measured.

4. The flow rate measurement device according to claim 1,
    wherein a waterproof and moisture-permeable filter is disposed at the communication port.

5. The flow rate measurement device according to claim 4,
    wherein the filter is fixed from an inner side of the measuring chamber.

6. The flow rate measurement device according to claim 1, wherein the measuring chamber has a protruding portion that surrounds the communication port on the main passage side of the surface that has the communication port.

7. The flow rate measurement device according to claim 6, wherein the protruding portion has a tapered portion for an opening portion to be widened toward the main passage side.

8. The flow rate measurement device according to claim 1, wherein the connector terminal is not increased in number through integration with the environment sensor because an output of the environment sensor is superimposed on an output of the flow rate measurement device.

* * * * *